United States Patent [19]

Marken

[11] 4,438,343
[45] Mar. 20, 1984

[54] WAVE POWER GENERATOR

[76] Inventor: John P. Marken, 525-149 W. El Norte Pkwy., Escondido, Calif. 92026

[21] Appl. No.: 440,968

[22] Filed: Nov. 12, 1982

[51] Int. Cl.³ .............................................. F03B 13/12
[52] U.S. Cl. ....................................... 290/53; 60/505; 60/507; 417/332
[58] Field of Search ...................... 290/42, 53; 60/495, 60/497, 499, 500, 501, 505, 506, 507; 417/330-332

[56] References Cited

U.S. PATENT DOCUMENTS 3,204,110  8/1965  Masuda ................................. 290/42

Primary Examiner—J. V. Truhe
Assistant Examiner—Shelley Wade
Attorney, Agent, or Firm—Brown & Martin

[57] ABSTRACT

An apparatus for converting the wave motion of a body of water to electrical energy includes a housing having a pair of opposed counter rotating shafts mounted to a common output shaft for driving the output shaft in a single direction and includes counterweights for restraining the shafts against rotation during oscillation of the housing about the axis of the shafts for thereby converting oscillating motion of the housing into intermittent unidirectional motion of the two counter rotating shafts and a substantially continuous motion of the output shaft which is connected to a generator unit for generating electrical energy. A torque storage spring is utilized to store the rotary energy and maintain a substantially constant speed output of the shaft to the electrical generator. The apparatus is self-contained within the housing that may be selectively mounted in a proper position on a boat or other floating structure and oriented to take advantage of the predominant roll or pitch of the structure for converting that motion into the required rotary output motion.

8 Claims, 4 Drawing Figures

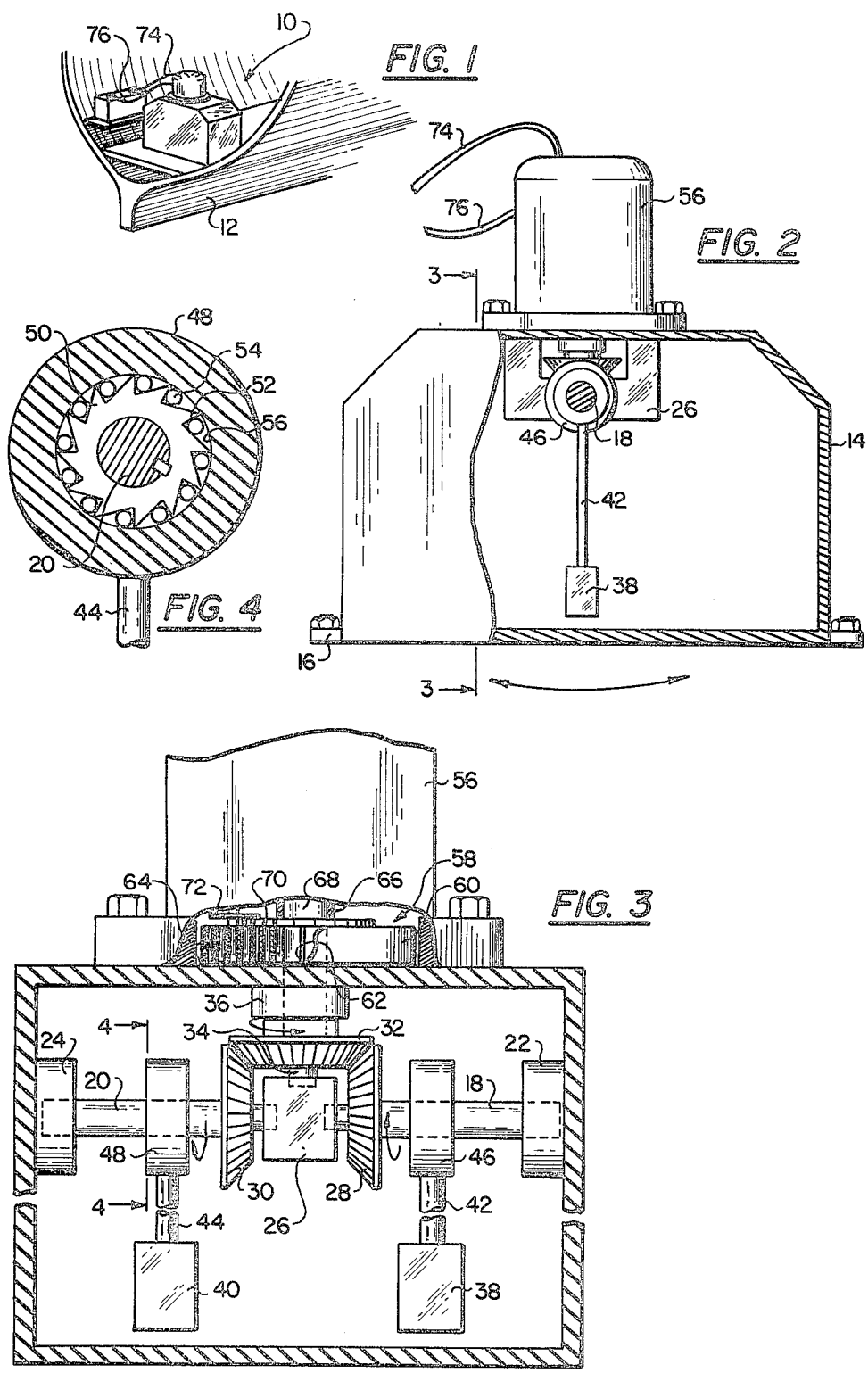

WAVE POWER GENERATOR

BACKGROUND OF THE INVENTION

The present invention relates to energy converting and storing apparatus and pertains particularly to an apparatus for converting the pitch and roll motion of a marine structure to useful electrical energy.

Many devices have been proposed in the past for converting the pitch and roll or wave energy of a body of water to electrical or other useful energy. Most of these devices, however, attempt to provide an apparatus that is responsive to all degrees of motion in an effort to obtain the maximum energy output. These devices, however, become complicated, expensive, and inefficient due to the attempt to maximize the response to all the available motion.

Examples of the prior art approach to the conversion of wave motion to useful energy is disclosed in the following U.S. patents:
U.S. Pat. No. 974,869 issued Nov. 8, 1910 to Farmer;
U.S. Pat. No. 3,200,255 issued Aug. 10, 1965 to Masuda;
3,204,110 issued Aug. 31, 1965 to Masuda;
3,231,749 issued Jan. 25, 1966 to Hinck III;
3,631,670 issued Jan. 4, 1972 to Vassilakis;
3,774,048 issued Nov. 20, 1973 to Hardingham;
3,912,938 issued Oct. 14, 1975 to Filipenco; and
4,317,047 issued Feb. 23, 1982 to de Almada.

The Hardingham patent discloses a device for mounting in a vessel such as a powered or sailboat and taking advantage of the pitch and roll of the boat for generating electrical power. The device, however, attempts to take advantage of all possible motions of the boat to generate power and thereby becomes somewhat complicated and inefficient.

The Masuda patent, U.S. Pat. No. 3,204,110, is of interest in that it discloses a somewhat simple buoy structure which functions in response to a single axis of collection of the buoy.

The remaining patents are all of general interest in that they disclose various apparatus for converting wave energy to electrical or other forms of energy.

The present invention was developed as a simplified apparatus for mounting as a self-contained unit on boats and other such floating marine structures to take advantage of either the pitch or roll of the structure to generate electrical energy.

SUMMARY AND OBJECTS OF THE INVENTION

It is the primary object of the present invention to provide an improved wave power generator.

In accordance with the primary object of the present invention, a wave power generator for converting the pitch or roll of a marine body includes a housing having a pair of coaxial counter rotating input shafts connected for rotating an output shaft and with counterweights connected by unidirectional couplings to the shaft which, in turn, are also coupled by unidirectional couplings to the housing such that oscillation of the housing relative to the counterweights to intermittently drive the coaxial input shafts and thereby drive the output shaft for driving a generator for generating electrical power.

BRIEF DESCRIPTION OF THE DRAWINGS

The above and other objects and advantages of the present invention will become apparent from the following description when read in conjunction with the drawings wherein:

FIG. 1 is a perspective view of an apparatus in accordance with the invention shown in position on a boat;

FIG. 2 is an elevational view of the apparatus with portions broken away to show details;

FIG. 3 is a sectional view taken generally on line 3—3 of FIG. 2;

FIG. 4 is a sectional view taken on line 4—4 of FIG. 4.

DETAILED DESCRIPTION OF PREFERRED EMBODIMENTS

Turning to FIG. 1 of the drawing, a generator unit 10 is shown inside boat 12 floating on a body of water and subject to the waves therein. The generator unit 10 in accordance with the invention is positioned and secured on the boat 12 in a suitable position to take advantage of either the predominant roll or pitch of the boat, depending upon the predominant motion experienced at the particular time. Preferably the roll or oscillation axis of the unit is selectively positioned and oriented to take maximum advantage of the predominant motion. For example, should the boat be anchored to swing freely about its anchor, the predominant motion would likely be the pitch of the boat. On the other hand, should the boat be secured to a dock, the predominant motion may be a roll of the boat about the longitudinal axis thereof.

Also, the device of the present invention is preferably positioned within the boat to optimize the motion, particularly the roll motion of the unit about its roll axis.

Turning to FIG. 2 of the drawing, an apparatus in accordance with the invention includes a housing suitable for providing a self-contained unit and includes suitable bracket means 16 for attachment to a floating marine structure. The motion device is contained within the housing 14 and includes first and second coaxially mounted counter rotating shafts 18 and 20 mounted in bearing blocks 22 and 24 in the housing and in a suitable central bearing block 26. The shafts each, preferably, include unidirectional couplings also mounted within the bearing blocks 22 and 24 for intermittently coupling the shaft to the wall of the housing to prevent rotation thereof in one direction of motion.

The shafts each include bevel gears 28 and 30 at the inner end thereof which is drivingly connected to bevel gear 32 of an output shaft 34 which is rotatably mounted in suitable support bearings 36 in the housing. The arrangement is such that the counter rotating shafts 18 and 20 drive the output 34 in a unitary direction.

Each of the shafts 18 and 20 are provided with a counterweight 38 and 40 each of which is mounted on an arm 42 and 44 and which in turn is mounted on the respective shaft by means of a suitable journal and coupling units 46 and 48 having a one way coupling incorporated therein as illustrated in FIG. 4.

The one way couplings 46 and 48 of the counterweights 38 and 40 (FIG. 4) are selected to cooperate with the stationary couplings 22 and 24, such that the shafts 18 and 20 may rotate freely in one direction relative to the respective counterweights 38 and 40, but is coupled and held in the other direction with respect to the counterweight. The one way couplings are essentially identical in construction, but differ in orientation.

Referring to FIG. 4, the coupling 48, which is typical of all couplings is illustrated. Within the journal 48 is a one way coupling including a cam rotor 50 keyed to rotate with shaft 20. A plurality of ramp cams 52 cam rollers 54 radially outward into gripping engagement with cylindrical wall or bore 56 to prevent rotation of shaft 20 in the counter clockwise direction relative to the journal 48. Rotation of shaft 20 in the clockwise direction cams rollers 54 inward out of engagement with bore 56.

In a preferred operation of the device, the housing is mounted such that the oscillating axis thereof which coincides with the axis of the counter rotating shafts 18 and 20 is substantially aligned with the pitch or roll axis of the boat 12. With this arrangement, the pitch or roll of the marine body or boat, results in a oscillation of the housing about its oscillatory axis. The counterweights maintain a generally vertical position and are preferably sufficient in mass to maintain the vertical direction and counteract the torque applied to the shafts 18 and 20 for driving the output shaft 34. The counterweights 38 and 40, thus, primarily act as counterweights rather than as pendulums. However, it will be appreciated that the device can be selectively mounted such that the weights will swing and act as pendulums and thereby intermittently drive the shafts 18 and 20 relative to the housing 14.

The output shaft 34 is coupled to a suitable electrical generator 56 and preferably primarily by way of a energy storage unit, such as a spring device or coupling 58 which stores the rotary motion of the shaft and transmits it in a substantially continuous uniform rotation to the generator. The energy storage unit 58 includes a coiled leaf-type spring 60 connected at one end 62 to the shaft 34 and the other end to a drum 64 within which the spring 60 is coiled. The drum 64 is then coupled by splined or keyed coupling 66 to the drive shaft 68 of the electrical generator 56. An escapement device including a ratchet wheel 70 and an oscillating pin wheel 72 such as that used in clocks maintains a constant velocity of rotation of the output from the spring storage device. Thus, the generator maintains a substantially constant rotation generating electrical power which may then be transmitted by electrical cables 74 and 76 to be stored in storage batteries 78 (FIG. 1), thus providing and storing electrical energy which thus becomes available for use for lights, engine starting, etc.

An alternate electrical generator system could utilize an electrical impulse generator with appropriate electrical circuit for converting the impulse energy for storage in a suitable battery. The present invention was designed to have a single axis of oscillation thereby simplifying the device and making it more efficient in terms of its predominant mode of oscillation. Thus, the device when properly selectively installed on a boat or suitable structure, may be left unattended for long periods of time and, thus continue to respond to the wave action of the body of water and generate and store electrical energy.

In operation, the device is selectively positioned and oriented on a floating marine structure such as a boat so that the axis of shafts 18 and 20 substantially coincide with the predominant one of the pitch or roll axis of the boat. As the boat rolls about its axis, it rolls the housing 14 about its axis, with counterweights 38 and 40 remaining essentially vertically to permit shafts 18 and 20 to rotate in the direction of the arrows. (FIG. 3). The one way couplings 22 and 24 alternately couple and uncouple the oscillating housing 14 to alternately drive one shaft and then the other. As the housing swings clockwise (FIG. 2) it grips and rotates shaft 18 clockwise at the same time shaft 20 is held by counterweight 40 against rotation transmitting the drive to gear 32.

As the housing swings back counterclockwise, coupling 22 releases shaft 18 and coupling 46 couples to it to prevent its rotation by counterweight. The coupling 24 couples housing 14 to shaft 20 rotating it counterclockwise with the housing, thereby continuing to drive gear 32 and the generator 36 in the same direction as before. Thus, continued oscillation of the housing 14 continues to drive alternate ones of the output shafts 18 and 20, thereby providing a unidirectional rotation of the output shaft 34. The output from shaft 34 can be used to drive any selected device directly or it can be stored by any number of systems such as a flywheel, compressed air, spring, hydraulic accumulator, etc.

While I have illustrated and described my invention by means of specific embodiments, it is to be understood that numerous changes and modifications may be made therein without departing from the spirit and scope of the invention as defined in the appended claims.

I claim:

1. An apparatus for converting the pitch and roll motions of a floating marine body into mechanical energy, comprising:

a housing having means defining a fixed horizontal oscillatory axis, said housing adapted for mounting on a buoyant structure for floating on a body of water;

a first input shaft and a second input shaft coaxially mounted in said housing and including unidirectional coupling means for constraining said first and second shafts for counter rotation about said oscillatory axis;

first counterweight means mounted eccentrically on said first shaft and including means for restraining rotation of said shaft relative thereto in a first direction;

second counterweight means mounted eccentrically on said second shaft and including means for restraining rotation of said shaft relative thereto in a second direction; and an output shaft drivingly connected connected to both said first and second input shafts for unidirectional rotation upon oscillatory motion of either one of said housing and said counterweights.

2. The generator of claim 1 wherein each of said counterweights is supported on an elongated arm; and each of said arms is coupled to its respective one of said shafts by means of one way coupling means defining said means for restraining rotation.

3. The generator of claim 2 including an electrical generator drivingly coupled to said output shaft for generating electrical power; and electrical storage means for storing electrical power generated by said generator.

4. The generator of claim 3 wherein said output shaft extends at a right angle to said input shafts and is connected thereto by bevel gearing.

5. The generator of claim 4 including one way coupling means for alternately coupling said first and second input shafts for rotation therewith during oscillation of said housing substantially about the axis of said shafts.

6. The generator of claim 2 including a spring energy storage device coupled to said output shaft for storing energy from said output shaft.

7. The generator of claim 6 including an electrical generator coupled to be driven by said spring energy storage device.

8. The generator of claim 7 wherein said spring energy storage device includes means for regulating the speed of rotation of said generator.

* * * * *